(12) United States Patent
Kretschmar et al.

(10) Patent No.: US 7,861,418 B2
(45) Date of Patent: Jan. 4, 2011

(54) RECIPROCATORY SAW

(75) Inventors: Volker Kretschmar, Köngen (DE);
Torsten Reuß, Dettingen unter Teck (DE)

(73) Assignee: Festool GmbH, Wendlingen (DE)

( * ) Notice: Subject to any disclaimer, the term of this patent is extended or adjusted under 35 U.S.C. 154(b) by 340 days.

(21) Appl. No.: 12/069,288

(22) Filed: Feb. 8, 2008

(65) Prior Publication Data
US 2008/0209742 A1   Sep. 4, 2008

(30) Foreign Application Priority Data
Mar. 1, 2007   (DE) .................. 10 2007 009 943

(51) Int. Cl.
*B23D 51/10*   (2006.01)
*B27B 19/09*   (2006.01)
(52) U.S. Cl. .............................. 30/392; 30/337; 279/71
(58) Field of Classification Search .............. 30/337, 30/392; 279/71, 72, 81
See application file for complete search history.

(56) References Cited

U.S. PATENT DOCUMENTS

| 3,750,283 A | | 8/1973 | Hoffman | |
|---|---|---|---|---|
| 5,306,025 A | * | 4/1994 | Langhoff | 279/90 |
| 5,340,129 A | * | 8/1994 | Wright | 279/90 |
| 5,487,221 A | * | 1/1996 | Oda et al. | 30/392 |
| 5,644,847 A | * | 7/1997 | Odendahl et al. | 30/394 |
| 5,946,810 A | * | 9/1999 | Hoelderlin et al. | 30/392 |
| 6,209,208 B1 | | 4/2001 | Marinkovich et al. | |
| 6,725,548 B1 | * | 4/2004 | Kramer et al. | 30/392 |
| 7,251,897 B2 | * | 8/2007 | Shuhua | 30/392 |
| 2008/0209742 A1 | * | 9/2008 | Kretschmar et al. | 30/392 |

FOREIGN PATENT DOCUMENTS

DE   199 47 840 A1   4/2000

OTHER PUBLICATIONS

Office Action from the Germany Patent Office dated Oct. 5, 2007 (2 pages).

* cited by examiner

*Primary Examiner*—Hwei-Siu C Payer
(74) *Attorney, Agent, or Firm*—Flynn, Thiel, Boutell & Tanis, P.C.

(57) ABSTRACT

A reciprocatory saw, in particular, a jigsaw, is made up of a pitman with a chuck arranged for the releasable clamping of a saw blade. The chuck contains a movably mounted chuck jaw arrangement able to be clamped laterally against the saw blade shank, a wedge element arrangement adjacent to and for cooperation with the chuck means, a first spring acting downwardly on the inserted saw blade and a second spring acting on the wedge element arrangement downwardly. The wedge element arrangement is connected with the chuck jaw arrangement in a manner for the transmission of rotary movement and from the outside and is able to be shifted between a bottom clamping position clamping the chuck jaw arrangement against the saw blade shank and a top release position freeing the chuck jaw arrangement. The wedge element arrangement assumes an angular position turned in relation to the clamping position and is seated on a stationary holding face.

20 Claims, 10 Drawing Sheets

RECIPROCATORY SAW

BACKGROUND OF THE INVENTION

The invention relates to a reciprocatory saw, in particular, a jigsaw, comprising a pitman performing a reciprocatory motion during operation and on whose bottom end a chuck means is arranged for the releasable clamping of the shank of a saw blade, projecting in the mounted state downwardly out of the chuck means, the saw blade being able to be inserted upwardly in the longitudinal direction into the chuck means and to be removed downwardly out of the chuck means.

SHORT SUMMARY OF THE INVENTION

Taking a reciprocatory saw of this type as a starting point, an object of the present invention is to so design the chuck means such that the insertion and removal of the saw blade may take place without using a tool, with the simplest possible handling of the saw. In this respect, the construction of the saw is to be as simple and economic as possible and the chuck means is to be functionally robust.

In order to achieve these and/or other objects appearing from the present specification, claims and drawings, in the present invention, the chuck means comprises a movably mounted chuck jaw arrangement able to be clamped against the side of the saw blade shank, a wedge element arrangement for cooperation with the chuck jaw arrangement and externally adjacent to the chuck jaw arrangement, a first spring means whose spring force acts downwardly on the inserted saw blade and a second spring means whose spring force acts on the wedge element arrangement downwardly, the wedge element arrangement being connected with the chuck jaw arrangement in a manner for the transmission of rotary movement and from the outside is able to be shifted between a bottom clamping position clamping the chuck jaw arrangement inwardly against the saw blade shank and a top release position freeing the chuck jaw arrangement, in which the wedge element arrangement assumes an angular position turned in relation to the clamping position and is seated on a holding face holding the wedge element arrangement in the released position, a stationary abutment face being present, which is associated with an abutment arrangement on the saw blade shank so that, when the saw blade shank is clamped the abutment arrangement is held by the first spring means in a downward direction against the abutment face and when the wedge element and chuck jaw is in the turned release position, it may be shifted past the abutment face.

For the insertion of the saw blade, the wedge element arrangement is transferred against the force of the second spring means into its turned release position. Then the shank of the saw blade in the right angular position is introduced into the chuck jaw arrangement following which the user must turn the saw blade, projecting from the chuck means, somewhat, so that the shank comes clear of the stationarily arranged holding face and the second spring means thrusts the wedge element arrangement downward into the chucked position, in which the wedge element arrangement holds the chuck jaw arrangement against the saw blade so that the same will assume its chucked working position. When this occurs, the saw blade shank is held fast by the first spring means in the longitudinal direction of the saw blade against the stationary abutment face.

All these operations occur automatically with the exception of the transfer of the wedge element arrangement into the release position and the turning of the saw blade so that handling is extremely simple.

For the removal of the saw blade, the wedge element arrangement is shifted into the release position again, the chuck jaw arrangement participating in the rotary movement with the saw blade so that the chuck jaw arrangement releases the saw blade and the saw blade is ejected by the force of the first spring means past the stationary abutment face.

The chuck means in accordance with the invention furthermore has a comparatively small number of components and is simple in its structure.

Further advantageous developments of the invention are defined in the claims.

Further advantages and convenient forms of the invention will be understood from the following detailed descriptive disclosure of one embodiment thereof in conjunction with the accompanying drawings.

DETAILED ACCOUNT OF WORKING EMBODIMENTS OF THE INVENTION

Figure 1:
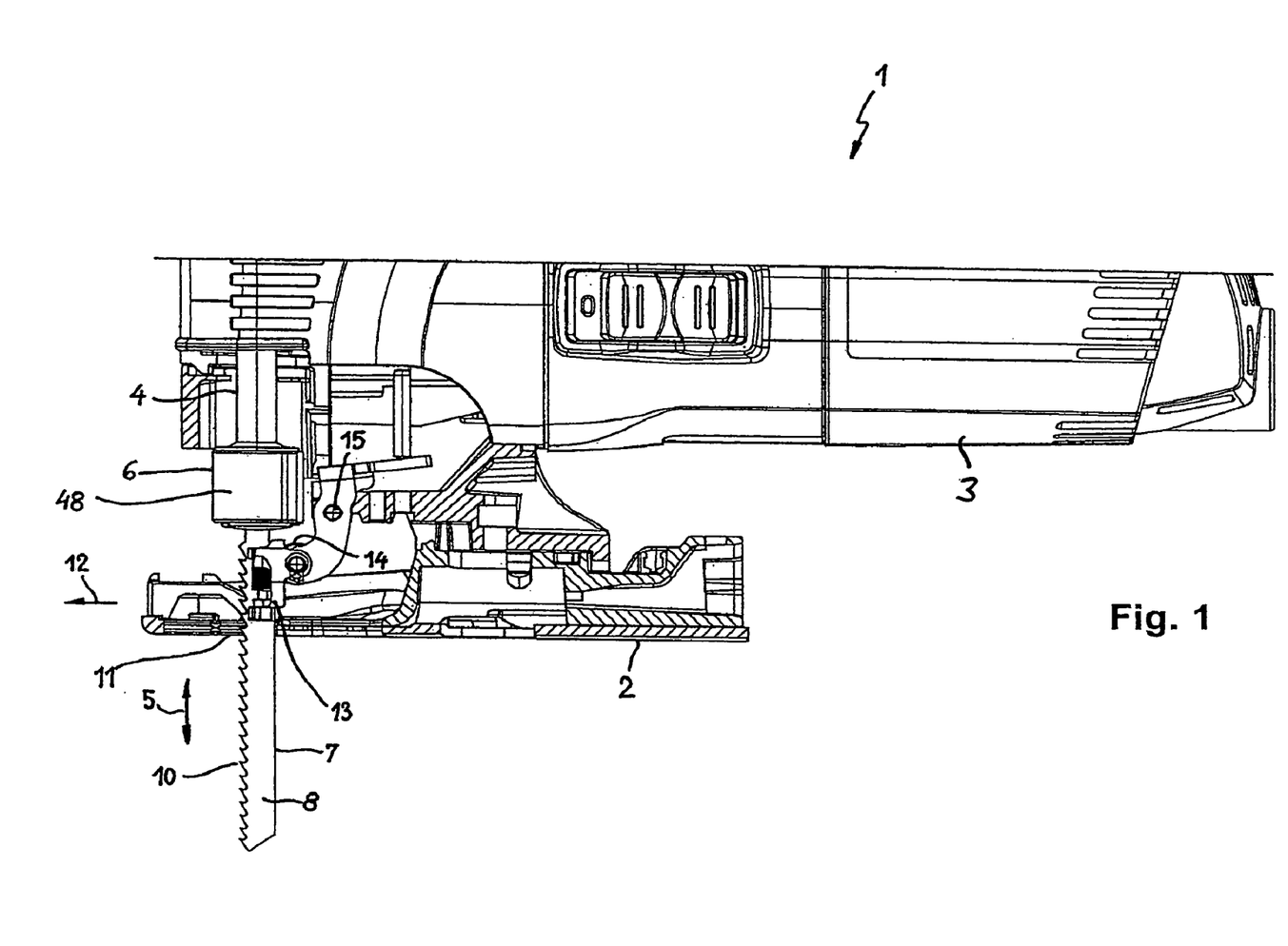
FIG. 1 shows a reciprocatory saw in accordance with the invention in the form of a jigsaw in a foreshortened side elevation, partly in longitudinal section.
Figure 2:
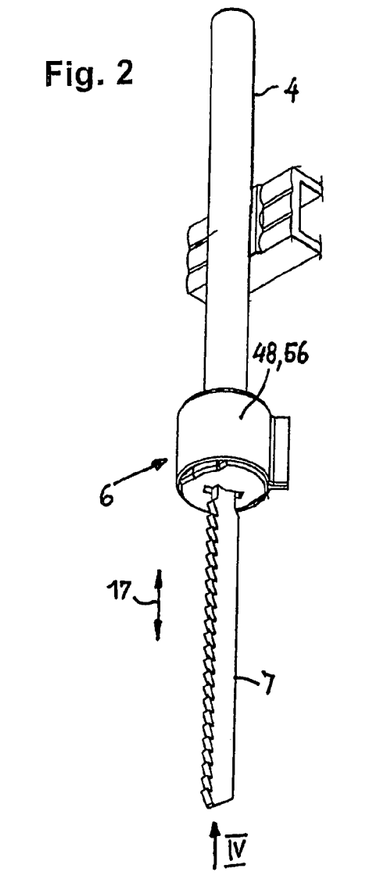
FIG. 2 shows the pitman with the chuck means and a chucked saw blade in a separate view looking obliquely from below.
Figure 3:
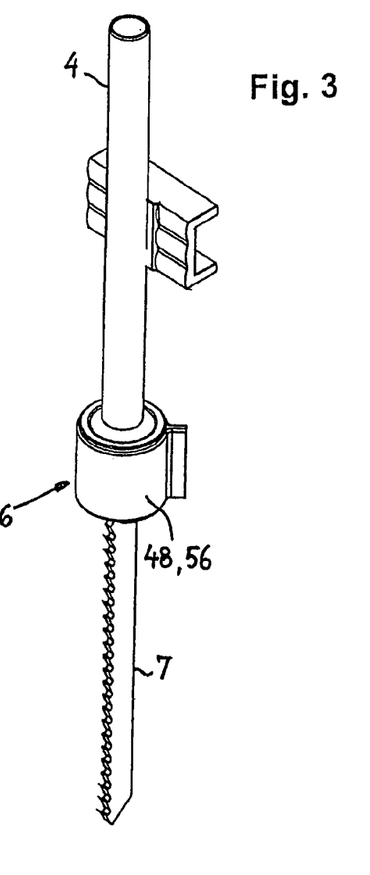
FIG. 3 shows the arrangement of FIG. 2 in an oblique view from above.

The jigsaw 1 illustrated in the drawings has a saw foot 2 by means of the jigsaw 1 is laid on the workpiece (not illustrated). The jigsaw 1 furthermore possesses above the saw foot 2 a drive unit 3, which in a conventional manner comprises a drive motor and a transmission, by way of which, during operation, a pitman 4 is caused to reciprocate in the direction of the double arrow 5. At the bottom end of the pitman 4 a chuck means 6 is arranged for detachably chucking a saw blade 7 projecting downwardly out of the chuck means 6 and partaking in the reciprocating motion, the saw blade having an elongated configuration with two mutually parallel flat sides 8, 9 and the front edge 10 of the saw blade being adapted for cutting the workpiece with a row of teeth as depicted.

The jigsaw 1 is designed as a hand tool and can be grasped by the user holding the housing of the drive unit 3.

The saw blade 7 is arranged at the front end portion of the jigsaw 1 and extends essentially at a right angle to the saw foot 2 downwardly to below the saw foot 2, which adjacent to the saw blade 7, possesses a forwardly opening recess 11 for the passage of the saw blade 7. If the workman pushes the jigsaw 1 over the respective workpiece in the feed direction 12, the vertically reciprocating saw blade 7 will make a cut in the workpiece.

Underneath the chuck means 6 there is, in the present case, a guide holder 13 (not of interest here) arranged on the jigsaw 1 which bears the guide elements for the two flat sides 8 and 9 of the saw blade 7, which steady the saw blade 7 laterally.

Furthermore, the jigsaw 1 in the working example has a pendulum roller 14, which engages the saw blade 7 at the rear and performs a pendulum movement about a pendulum axis 15 synchronous with the reciprocating motion of the saw blade 7 so that the reciprocating movement of the saw blade 7 is modulated with a pendulum component.

As regards the general design of the reciprocatory saw 1, it is also to be noted that the drive unit 3 is so arranged on the saw foot 2 that it may be pivoted about the feed direction 12 and may be set at the respective angle of pivoting. The drive unit 3 and the saw blade 7 may accordingly be pivoted to the one or the other side so that the saw blade 7 is aligned obliquely to the workpiece and may make a corresponding oblique cut, as for example a miter cut, in it.

The guide holder 13, the pendulum roller 14 and the pivoting support means for the drive unit 3 may also be omitted or may be differently designed.

The top end portion of the saw blade 7 constitutes a shank 16 able to be chucked or clamped, depending on the saw blade 7 being held in the chuck means.

The term "top" is employed in the present text to mean "remote from the workpiece to be sawn" and the term "bottom" to mean "adjacent to the workpiece to be sawn".

The shank 16 has a form conventional for saw blades. The portion provided with the row of saw teeth is adjoined by a narrower neck portion 18, on which an abutment arrangement is provided at a distance from the saw blade portion with the row of saw teeth, such arrangement being constituted by two abutment projections 20 and 21 on the front and rear sides of the saw blade.

The saw blade 7 can be inserted in the longitudinal direction (corresponding to the longitudinal direction of the saw blade and, accordingly, to the direction 5 of the reciprocating motion) from below into the chuck means 6 and removed downwardly out of the chuck means 6.

Figure 6:
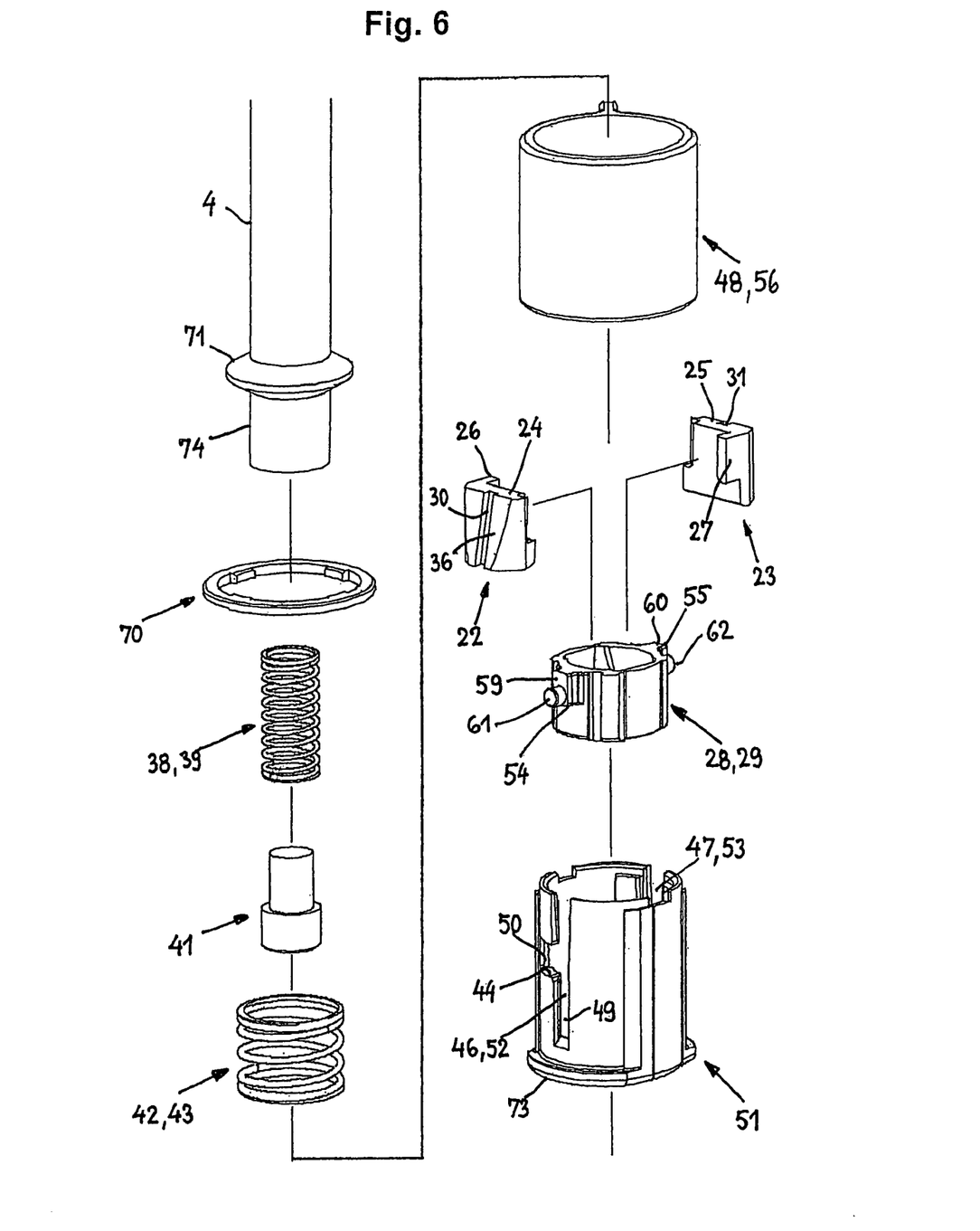
FIG. 6 shows the chuck means in an exploded view.

The present invention is concerned with the chuck means 6. It comprises a movably mounted chuck jaw arrangement adapted to press against the flat sides 8 and 9 of the shank 16, and preferably possesses two chuck jaws able to be thrust from opposite sides against the flat sides 8 and 9 of the shank located between the two chuck jaws. These two chuck jaws 22 and 23, in addition to their chuck portion 24 and 25 for the respective saw blade flat side 8 and 9, have an L-like rib 26 and 27 extending from it, which cooperates with the rear side and respectively the front side of the shank 16. Accordingly the two chuck portions 24 and 25 together with the two ribs 26 and 27 constitute a rectangular socket for the shank 16.

It will be apparent that the inserted shank 16 makes rotation transmitting engagement with the two chuck jaws 22 and 23.

The chuck jaw arrangement 22 and 23 is adapted to cooperate with a wedge element arrangement 28 adjacent to it and interacting with the chuck jaw arrangement 22 and 23, such wedge element arrangement being preferably constituted by an inner sleeve 29 surrounding the chuck jaw arrangement 22 and 23. In this system the wedge element arrangement 28 is connected in a rotation transmitting manner or more particularly engagement with the chuck jaw arrangement 22 and 23 so that the wedge element arrangement 28 may be turned together with the chuck jaw arrangement 22 and 23 and the saw blade 7.

The inner sleeve 29 constituting the wedge element arrangement 28 is furthermore mounted for sliding in the longitudinal direction 17. In its bottom chucking or clamping position as illustrated, the inner sleeve 29 acts on the chuck jaw arrangement 22 and 23 thrusting it inward against the shank 16 of the saw blade 7. If the inner sleeve 29 is shifted upward, the chuck jaw arrangement 22 and 23 will no longer be thrust against the shank 16 so that the chuck jaws 22 and 23 and now, as it were, loosely arranged and the shank will cease being clamped. The inner sleeve 29 constituting the wedge element arrangement 28 can be shifted by the artisan from the outside in a fashion still to be described.

The inner sleeve 29 and the chuck jaw arrangement 22 and 23 are, as already mentioned, engaged with each other in a manner transmitting rotation. In this respect the inner sleeve 29 is able to be shifted in relation to the chuck jaw arrangement 22 and 23 while maintaining the rotation transmitting engagement. This is achieved in the working example because each of the chuck jaws 22 and 23 has a slot 33 and 31 extending on its outer side in the longitudinal direction 17, for an entraining dog 32 and 33, arranged on the inner sleeve 29, to extend into. This arrangement could also in principle be such that the longitudinal slots are arranged on the inner sleeve 29 and the entraining dogs are arranged on the chuck jaws 22 and 23.

Figure 7:
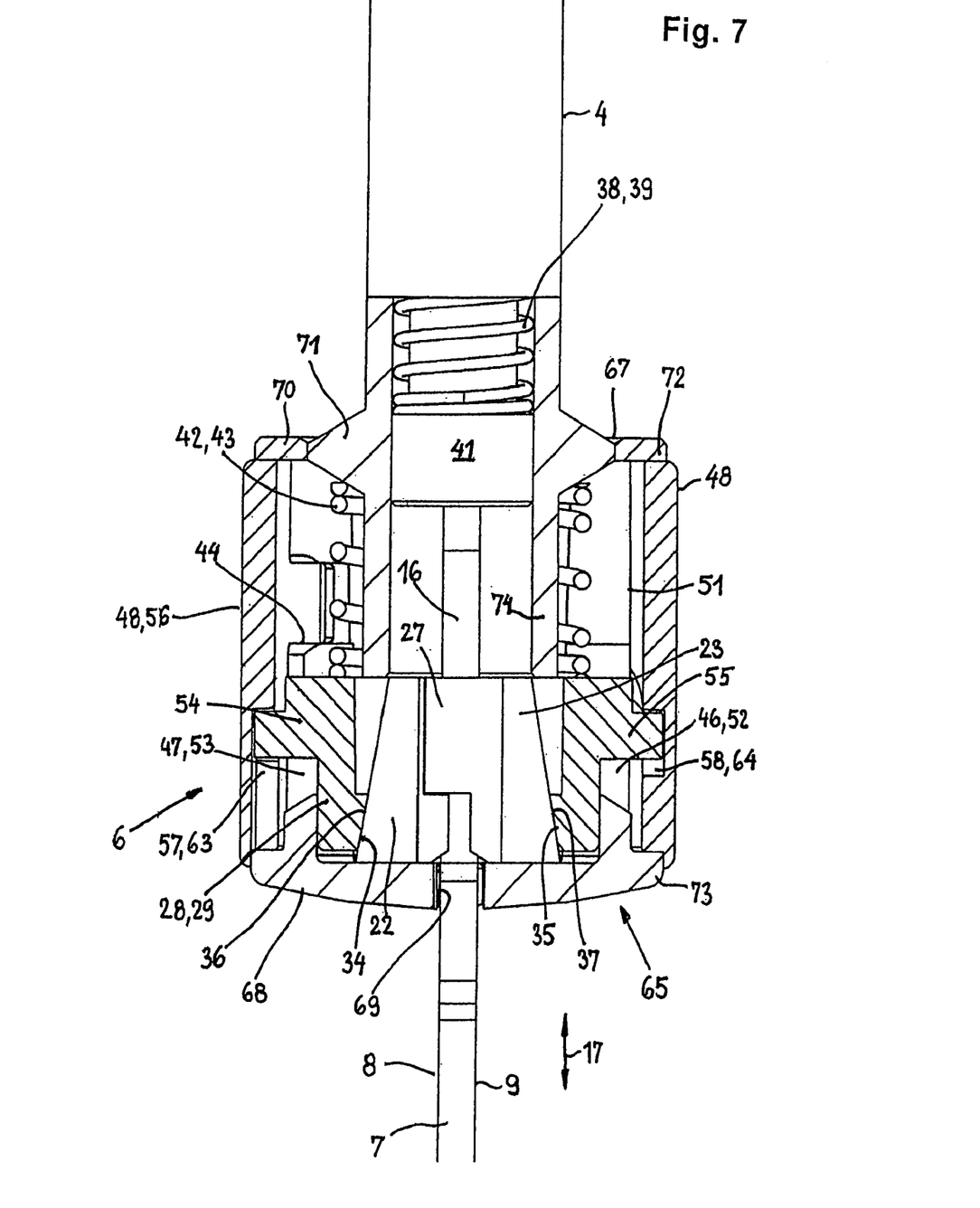
FIGS. 7 through 12 show the chuck means in various different longitudinal sections, the wedge element arrangement being located in the chucked position and the saw blade accordingly being in its working position.
Figure 8:
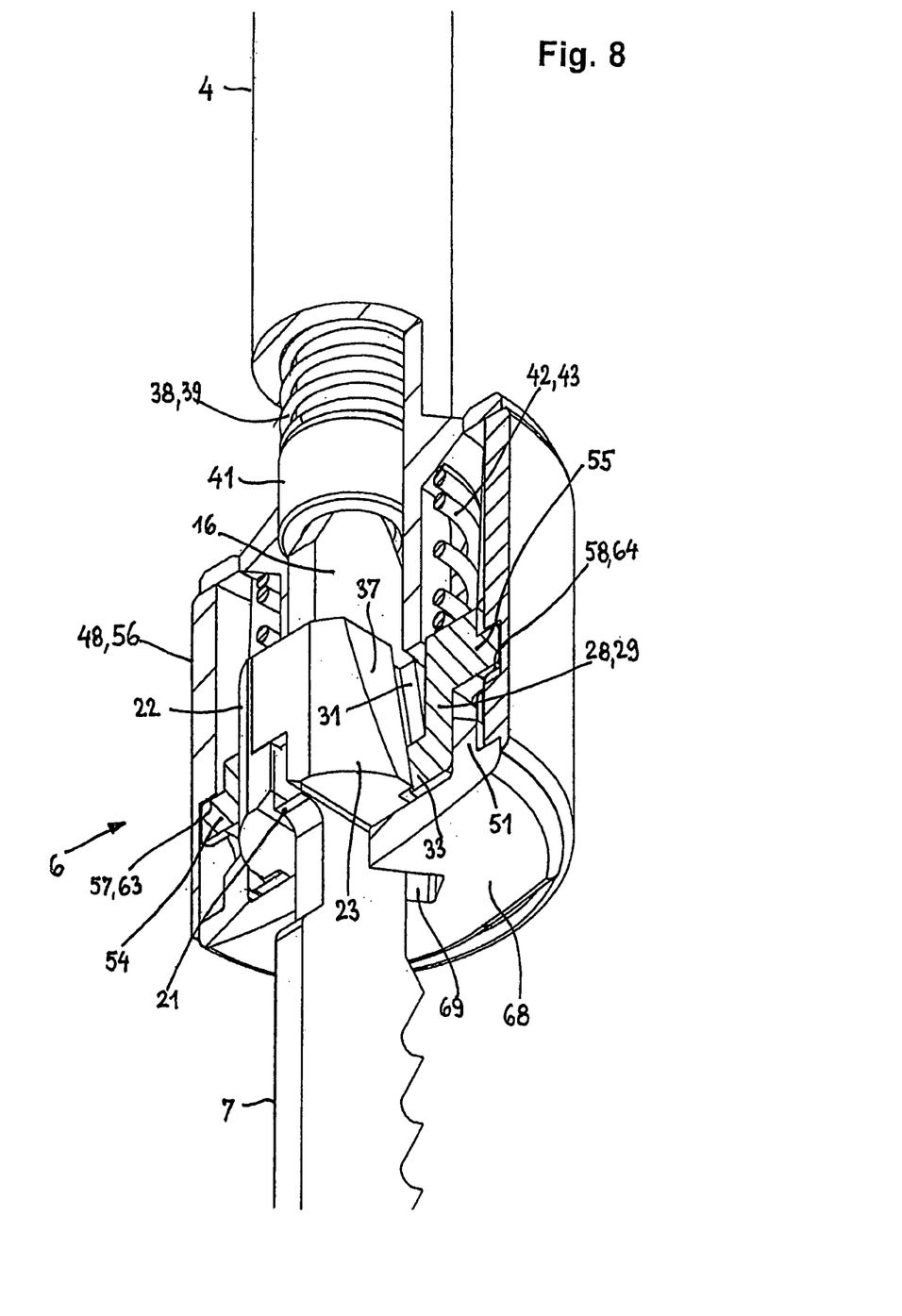
Figure 9:
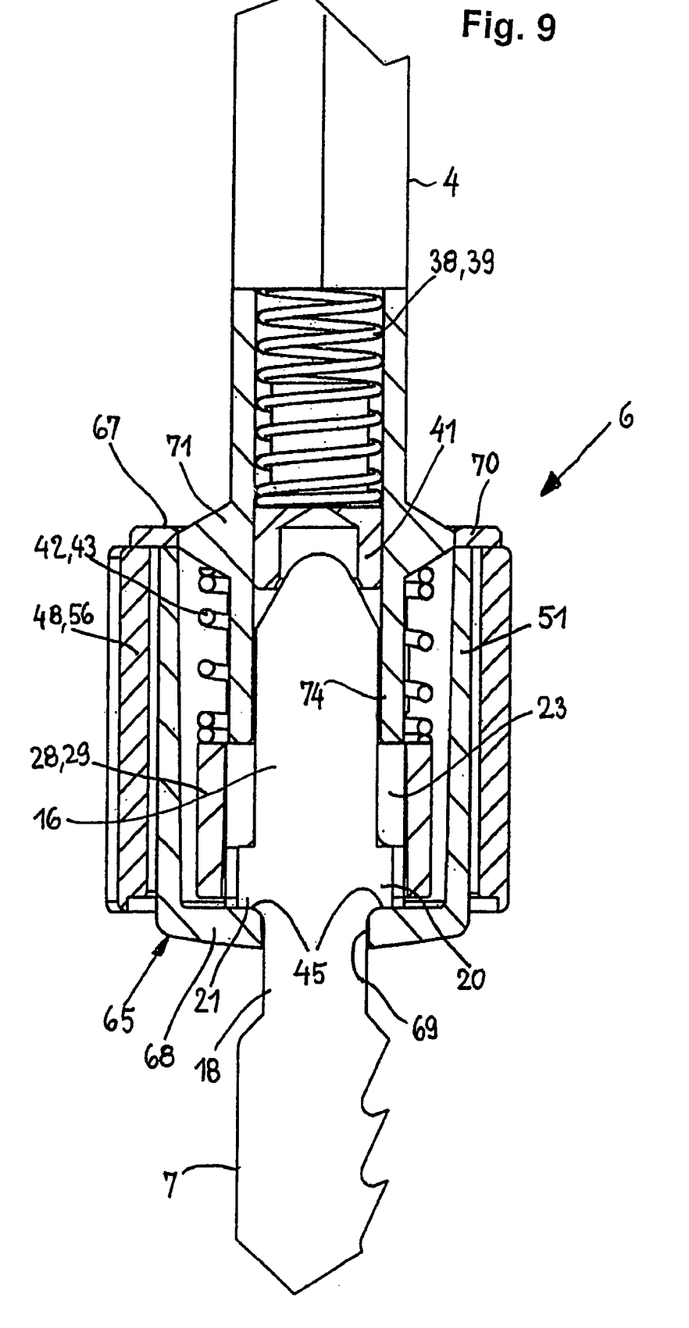
Figure 10:
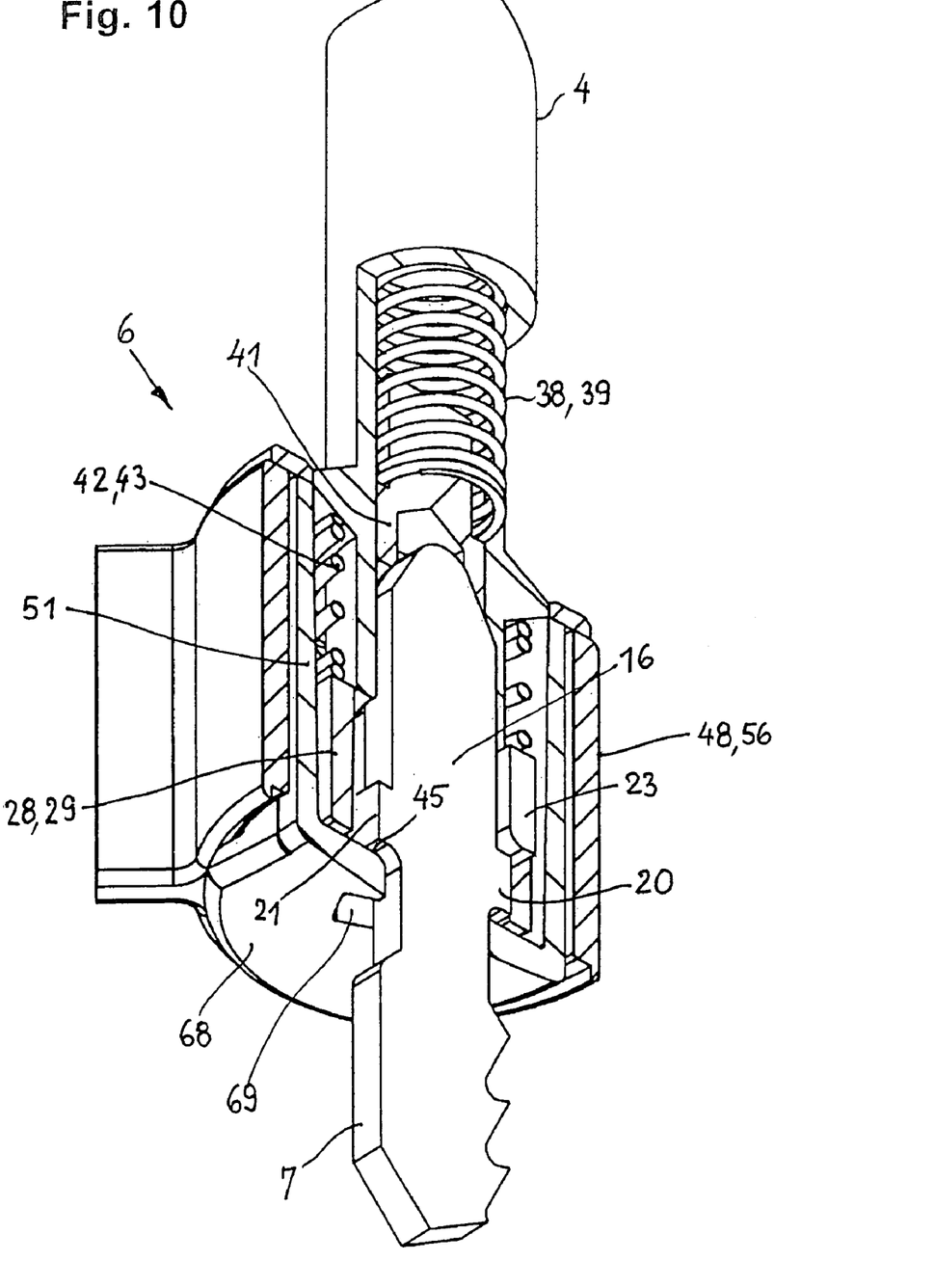

The inner sleeve 29 constituting the wedge element arrangement 28 and the chuck jaw arrangement 22 and 23 have cooperating wedge faces 34, 35, 36 and 37 by way of which the chucked or clamping force is applied. The wedge faces 34, 35, 36 and 37 run in the longitudinal direction 17 with an inwardly directed slope upwardly, as will more particularly appear from FIG. 7. The two wedge faces 34 and 35 on the inner periphery of the inner sleeve 29 are opposite each other and are respectively adjacent to the wedge face 36 and 37 on the outer periphery of the respective chuck jaw 22 and 23.

Figure 11:
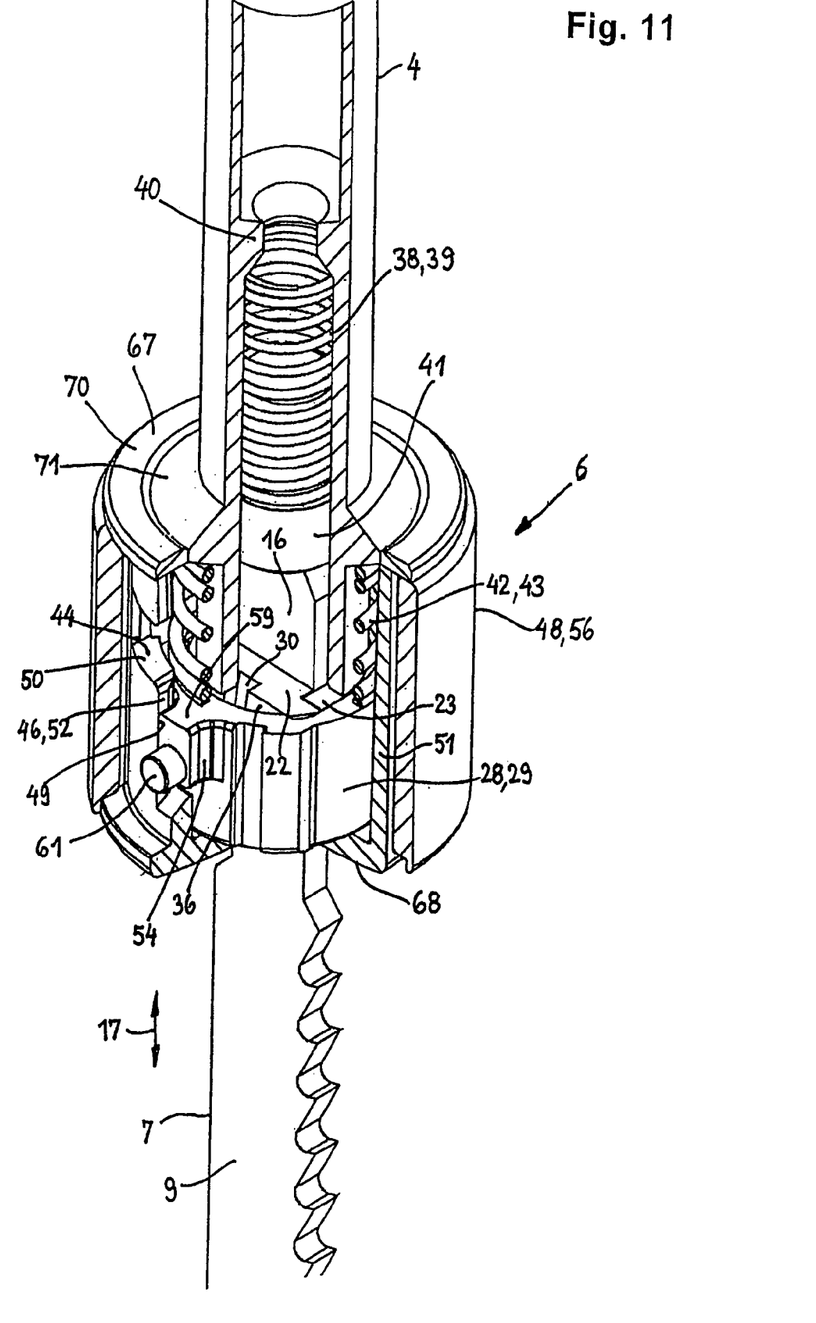

Furthermore the chuck means 6 comprises a first spring means 38, whose force acts on the inserted saw blade 7 in a downward direction. In this respect, the first spring 38 is preferably constituted by a helical spring 39. The helical spring 39 can, as illustrated, be arranged in the pitman 4 and bear at one end against the pitman 4, for example at a support shoulder 40 in the pitman 4 (see FIG. 11), and at the other end a thrust member 41 acting against the inserted saw blade 7.

Moreover, there is a second spring means 42, whose force acts on the wedge element arrangement 28, i.e., in the working example the inner sleeve 29, in a downward direction. The second spring means 42 can also be constituted by a helical spring 43.

The inner sleeve 29 forming the wedge element arrangement 28 is therefore held by the second spring 42 in its bottom clamping position. The movement of the inner sleeve 29 upward takes place against the force of the second spring means 42. In order for the inner sleeve 29 to automatically maintain the upper release position releasing the chuck jaw arrangement 22 and 23, the chuck means 6 possesses a holding face 44 arranged on it, on which the inner sleeve 29 rests after turning in the peripheral direction. For releasing the chuck jaws 22 and 23, the inner sleeve 29 is consequently not only shifted in the longitudinal direction 17 but also turned so that the inner sleeve 29 assumes, in the release position, an angular position turned out of the clamping position and is then seated on the holding face 44 so that the inner sleeve 29 is prevented from moving downward in the longitudinal direction.

The abutment arrangement constituted by the two abutment projections 20 and 21 on the shank 16 cooperates with an abutment face 45 arranged stationarily on the chuck means 6 so that, when the shank 16 of the saw blade 7 is inserted in position, the abutment projections 20 and 21 are restrained by the first spring means 38 and held down against the abutment face 45 and the saw blade 7 is not only gripped by the chuck jaws 22 and 23 but additionally fixed in position in the longitudinal direction 17 as well. If the inner sleeve 29 and the chuck jaw arrangement 22 and 23 are, on the other hand, in the top turned release position, the abutment projections 20 and 21 of the shank 16 may be moved past the stationary abutment face 45 in the longitudinal direction so that the saw blade 7 can be inserted or removed.

Using the measures explained so far, the workings of the arrangement may be described as follows:

If a saw blade is to be introduced into the chuck means 6 and clamped in it, the inner sleeve 29 constituting the wedge element arrangement 28 is shifted into the top release position which is rotated in relation to the bottom clamping position and in which it is held by the stationary holding face 44. On movement of the inner sleeve 29 into its release position, the second spring means 42 is tensioned. Then the saw blade 7 is introduced in a corresponding angular position from below into the chuck means 6 between the chuck jaws 22 and 23 (see FIG. 4). During such insertion the abutment projections 20 and 21 on the shank 16 move past the abutment face 45. Then the artisan will turn the saw blade into the appropriate angular position corresponding to the chucked position. Then the inner sleeve 29 comes clear of the holding face 44 so that it moves automatically downward owing to the force of the second spring means 42 into the chucked position and the shank 16 of the saw blade 7 is held by the chuck jaw 22 and 23. The saw blade 7 will then assume its working position, in which its abutment projections 20 and 21 are held by the force of the first spring means 38 acting on the saw blade in the longitudinal direction against the stationary abutment face 45.

For the removal of the saw blade 7, the inner sleeve 29 is shifted from the outside into its release position, in which the saw blade 7 not only comes clear of the chuck jaw 22 and 23 but also of the abutment face 45 and acted upon by the force of the first spring means 38, is pushed out downward.

Figure 13:
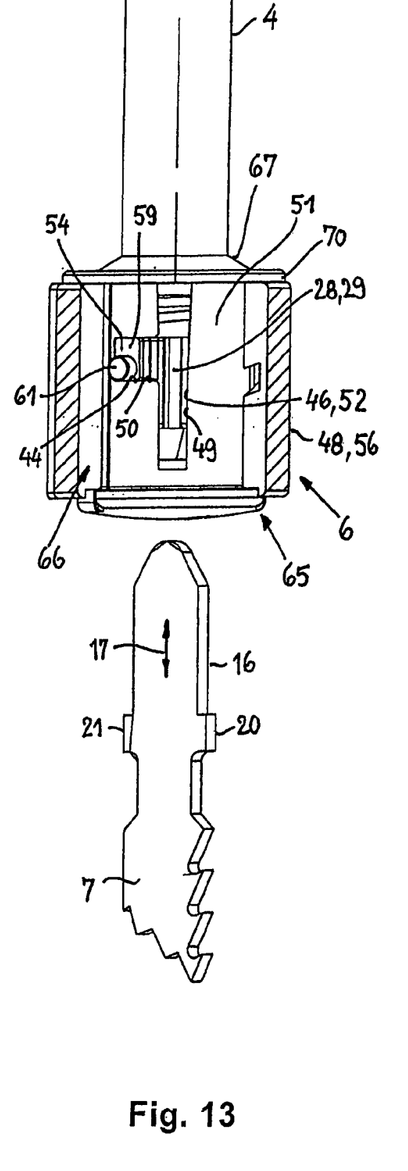
FIG. 13 shows the chuck means with its actuating sleeve in a sectioned view so that the chuck means otherwise appears in a side view, the wedge element arrangement being in its release position in which the saw blade may be inserted and, respectively, withdraw.
Figure 14:
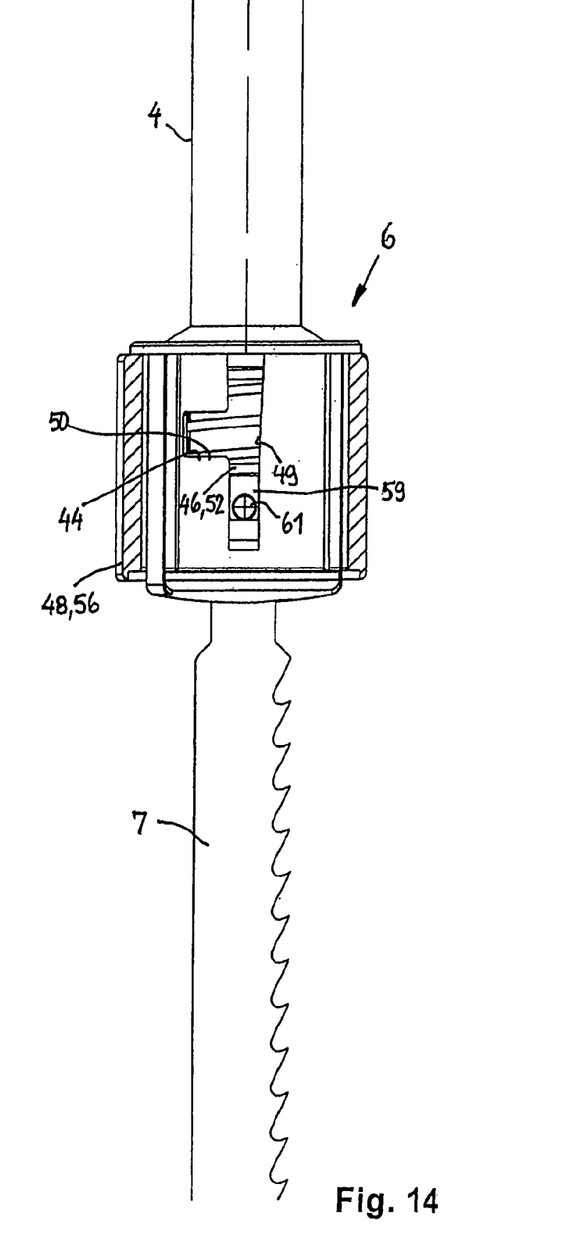
FIG. 14 shows the arrangement of FIG. 13 in which the wedge element arrangement is however in the chucked position and the saw blade is accordingly in its working position.

The path of movement of the inner sleeve 29 between the chucked position (see f. i. FIG. 14) and the release position (see for example FIG. 13), starting with the chucked position, is made up of a longitudinal portion extending in the longitudinal direction 17 and a rotary movement portion extending in the peripheral direction in relation to the holding face 44.

The wedge element arrangement 28, i.e., in the working example, the inner sleeve 29, is provided with at least one stationary guide track 46 and 47 and an actuating element 48 to be operated from the outside so that the inner sleeve 29 may be shifted by operation of the actuating element 48 along the at least one guide track 46 and 47 out of its bottom clamping position into the top and turned release position. Each guide track 46 and 47 is L-like in shape with a length portion 49 extending in the longitudinal direction 17 and a holding portion 50 extending in the peripheral direction and associated with the release position, such portion 50 constituting the holding face 44.

There are preferably two mutually opposite guide tracks 46 and 47 so that the inner sleeve 29 is guided at two positions.

The further paths 46 and 47 are arranged on a stationary outer sleeve 51 encircling the inner sleeve 29 and are constituted respectively by a guide slot 52 and 53 extending through the wall of the outer sleeve 51 from the inside to the outside. In this respect, each guide slot 52 and 53 is provided with a guide projection 54 and 55 supported by the wedge element arrangement 28, i.e., from the inner sleeve 29, and supported in the guide slot 52 and 53.

Furthermore, the actuating element 48 is constituted by an actuating sleeve 56 encircling the outer sleeve 51 and arranged in a manner allowing it to be rotated. In this respect, the respective guide projection 54 and 55 extends outward in front of the outer sleeve 51 and engages a cam 57 and 58 arranged on the actuating sleeve 56 so that when a workman turns the actuating sleeve 56, its rotary movement is converted into a movement of the at least one guide projection 54 and 55 along the guide track 46 and 47 of the outer sleeve 51.

The portion 59 and 60 running in the guide track 46 and 47 of the outer sleeve, of the guide projection 54 and 55, has an essentially block-like configuration. The portion 61 and 62 of the guide projection 54 and 55, associated with the cam 57 and 58, is essentially cylindrical and projects from the block-like portion 59 and 60.

The two cams 57 and 58 of the actuating sleeve 56 have such a shape that on rotation of the actuating sleeve 56 in cooperation with the guide tracks 46 and 47 of the outer sleeve 51 the inner sleeve 19, starting at the clamping position, is firstly lifted in the longitudinal direction 17 and is then turned into the release position.

The cams 57 and 58 are preferably respectively constituted by a cam groove or female cam 63 and 64 in the inner periphery of the actuating sleeve 56.

The actuating sleeve 56 is made without any openings and, more particularly, covers over the guide slots 52 and 53 of the outer sleeve 51 so that no dirt or dust may find its way from the outside into it.

For an easy running bearing means for the actuating sleeve 56 on the outer sleeve 51, the actuating sleeve 56 may make engagement by way of several support ribs which are peripherally distributed and preferably extend in the longitudinal direction.

As furthermore indicated in the drawings, the actuating sleeve 56 extends essentially along the entire length of the outer sleeve 51.

Figure 4:
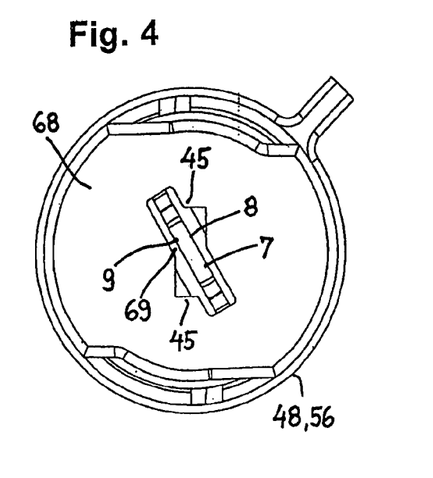
FIGS. 4 and 5 show the arrangement of FIGS. 2 and 3 in an end-on view from below as seen in the direction of the arrow IV, the wedge element arrangement (not visible in FIG. 4) and the chuck jaw arrangement being turned into the release position so that the inserted saw blade assumes a corresponding angular position, while the saw blade in FIG. 5 is in its working position, i.e., the invisible wedge element and chuck jaw arrangements are located in the chucked position.
Figure 5:
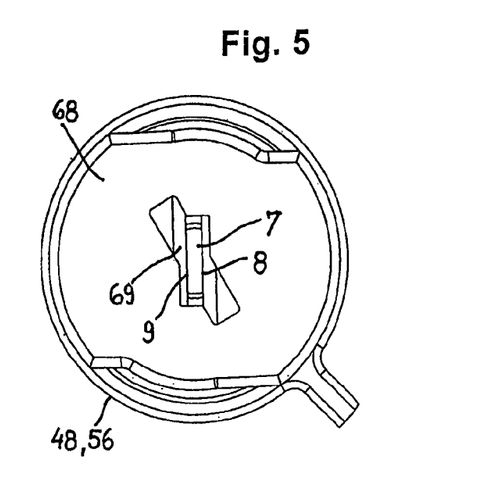

The outer sleeve 51 is a part of housing 65, rigidly joined with the pitman 4, of the chuck means 6. The housing 65 contains an inner space 66 accommodating the wedge element arrangement 28, i.e., the inner sleeve 29 and the chuck jaw arrangement 22 and 23, the inner space 66 being closed at its top side adjacent to the pitman 4 and at its opposite bottom side by a floor wall 68 rigidly joined with the outer sleeve 51. The floor wall 68 has a passage opening 69 allowing rotation of the saw blade 7. The detailed configuration of the passage opening 69 will be seen for example from the FIGS. 4 and 5. The passage opening 49 has such a length in the direction corresponding to the turned release position that the shank 16 of the saw blade 7 including the abutment projections 20 and 21 fits into it (FIG. 4). In the direction corresponding to the chucked or clamping position, the passage opening 69 is shorter so that the saw blade 7 can not be pulled out and, in fact, at its abutment projections 20 and 21 (adjacent to the passage recess 69) comes to rest on the inner face (facing the inner space 66) of the floor wall 68, the floor wall 68 constituting the above mentioned abutment face 45 (FIG. 5). The saw blade 7 is held by the first spring means 38 against the floor wall's inner face.

The floor wall 68 is preferably made integral with the outer sleeve 51.

The top wall 67 is in the working example constituted by a terminating ring 70 rigidly fixed in place, for example by welding, and an annular projection 71 on the pitman 4, the projection extending as far as the inner periphery of the terminating ring 70. In this arrangement the terminating ring 70 is also best rigidly joined to the annular projection 71, preferably by welding.

The actuating sleeve 56 is mounted for movement in the longitudinal direction 17 between radially projecting bearing projections 72 and 73 on the housing 65. The top bearing projection 72 can be constituted by the terminating ring 70, which projects radially in front of the outer sleeve 51, and the bottom bearing projection 73 can be formed by the floor 68, also projecting radially in front of the outer sleeve 51.

The second spring means 42, which at the bottom bears against the wedge element arrangement 28 and, respectively, the inner sleeve 29, may bear against the housing's top wall 67, and, in the present case, against the annular projection 71 on the pitman 4.

The pitman 4 has a spur 74 protruding into the inner space 66 in the housing 65. The helical spring 43 constituting the second spring means 42 surrounds this spur 74 and is therefore movably supported on it.

Figure 12:
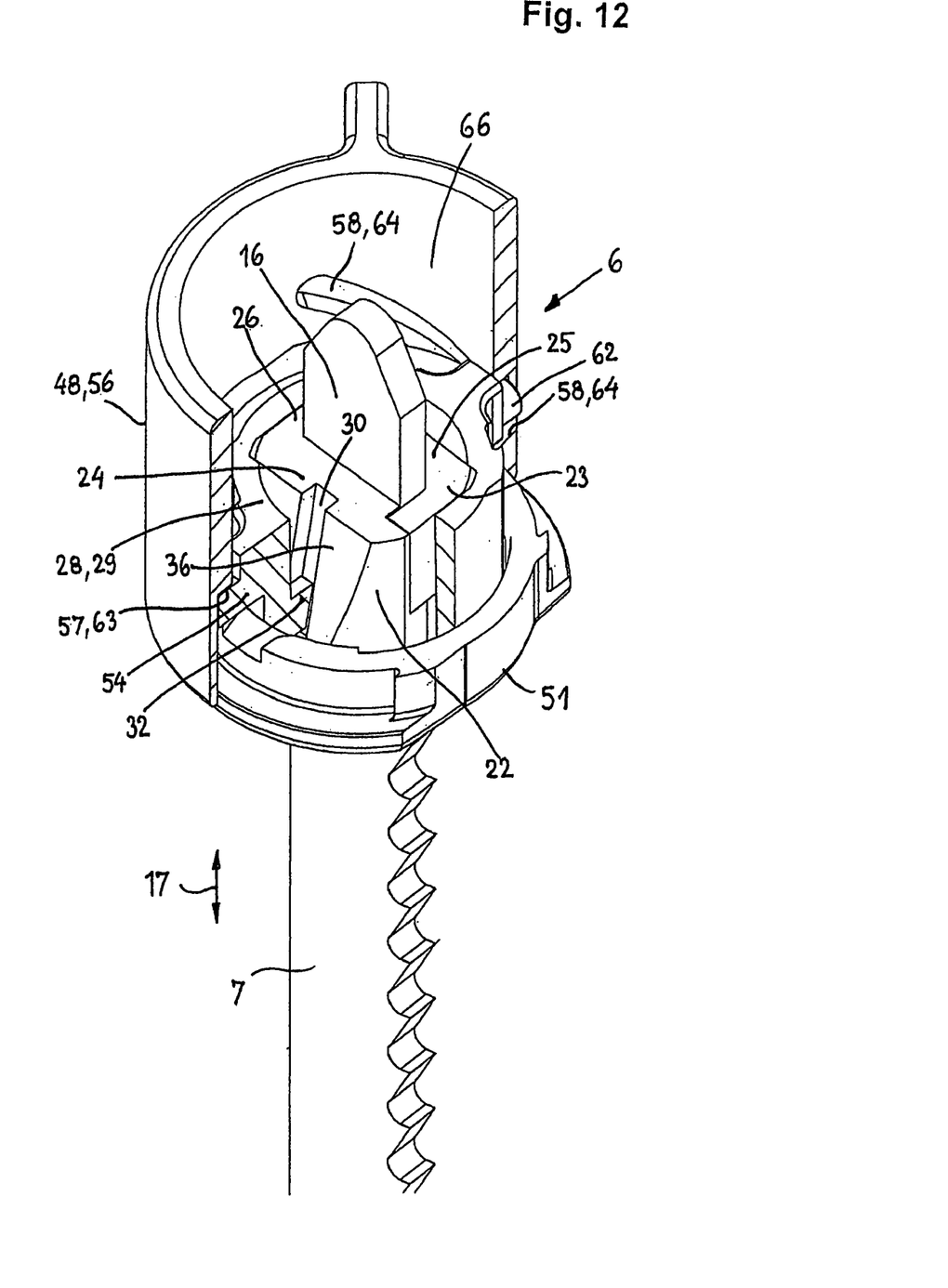

In FIG. 12, the pitman 4, the top wall 67 and the two spring means 38 and 42 are omitted so that the reader has a free view of the other components of the chuck means.

Accordingly, it may be generally seen that the saw blade 7 is inserted in the angular position more particularly illustrated in FIG. 4 through the passage opening 69 and assumes a position between the two chuck jaws 22 and 23, which together with the inner sleeve 29 constituting the wedge element arrangement, are located in the correspondingly turned release position. This release position is previously set by turning the actuating sleeve 56 and the accompanying adjustment of the inner sleeve 29 in the longitudinal direction and then in the peripheral direction. Following this, the artisan has to turn the saw blade 7 into its working position (FIG. 5). Here the inner sleeve 29 is entrained and, by it, the chuck jaw arrangement 22 and 23. Accordingly, the guide projections 54 and 55 come clear of the holding portion 50, extending in the peripheral direction, of the guide tracks 46 and 47 of the outer sleeve 51 so that the inner sleeve 29 is shifted by the force applied by the second spring means 42 down into the chucked position and the chuck jaws 22 and 23 are clamped against the shank 16 of the saw blade 7. The abutment projections 20 and 21 of the shank 16 are held by the first spring means 38 against the floor wall 68. If the saw blade 7 is to be removed, the user turns the actuating sleeve 56 so that the inner sleeve 29 arrives in its top, turned release position, in which the chuck jaws 22 and 23 are released from the shank 16. The saw blade 7 then assumes the turned position in accordance with FIG. 4 and is ejected by the first spring means 38 through the passage opening 69.

The angle between the chucking and the release angular positions is preferably in a range of approximately 30 degrees.

The invention claimed is:

1. A reciprocatory saw comprising a pitman for performing a reciprocatory motion during operation and on whose bottom end a chuck means is arranged for the releasable clamping of a shank of a saw blade which projects, in the mounted state, downwardly out of the chuck means, said saw blade being able to be inserted upwardly, in a longitudinal direction, into the chuck means and to be removed downwardly out of the chuck means, wherein the chuck means comprises a movably mounted chuck jaw arrangement able to be clamped against a side of the saw blade shank, a wedge element arrangement for cooperation with the chuck jaw arrangement and provided externally adjacent to the chuck jaw arrangement, the wedge element arrangement being provided with at least one stationary guide track and an actuating element able to be operated from the outside so that the wedge element arrangement can be shifted along the at least one guide track out of its chucked position into a release position, the at least one guide track being arranged on a stationary outer sleeve encircling the wedge element arrangement and being constituted by a guide slot extending outwardly through a wall of the outer sleeve, each guide slot having a guide projection projecting from the wedge element arrangement and supported in the guide slot, a first spring means having a spring force acting downwardly on the wedge element arrangement, the wedge element arrangement being connected with the chuck jaw arrangement in a manner for the transmission of rotary movement and from the outside is able to be shifted between a bottom clamping position clamping the chuck jaw arrangement inwardly against the saw blade shank and a top release position freeing the chuck jaw arrangement, in which the wedge element arrangement assumes an angular position turned in rotation to the clamping position and is seated on a holding face holding the wedge element arrangement in the release position, a stationary abutment face being present, which is associated with an abutment arrangement on the saw blade shank so that, when the saw blade shank is clamped, the abutment arrangement is held by the first spring means in a downward direction against the abutment face and when the wedge element arrangement and the chuck jaw arrangement are in the turned release position, it can be shifted past the abutment face.

2. The saw as set forth in claim 1, wherein the outer sleeve is a part of a housing, rigidly joined with the pitman, of the chuck means.

3. The saw as set forth in claim 2, wherein the housing contains an inner space for the wedge element arrangement and the chuck jaw arrangement, such inner space at its top side adjacent to the pitman being closed by a top wall connected with the pitman and at its opposite bottom side by a floor wall connected with the outer sleeve, the floor wall having a saw blade passage opening allowing rotation of the saw blade.

4. The saw as set forth in claim 3, wherein the floor wall is connected integrally with the outer sleeve.

5. The saw as set forth in claim 3, wherein the abutment face, against which the shank of the saw blade is held by the first spring means, is constituted by the inner face of the floor wall.

6. A reciprocatory saw comprising a pitman for performing a reciprocatory motion during operation and on whose bottom end a chuck means is arranged for the releasable clamping of a shank of a saw blade which projects, in the mounted state, downwardly out of the chuck means, said saw blade being able to be inserted upwardly, in a longitudinal direction, into the chuck means and to be removed downwardly out of the chuck means, wherein the chuck means comprises a movably mounted chuck jaw arrangement able to be clamped against a side of the saw blade shank, a wedge element arrangement for cooperation with the chuck jaw arrangement and provided externally adjacent to the chuck jaw arrangement, a first spring means having a spring force acting downwardly on the inserted saw blade and a second spring means having a spring force acting downwardly on the wedge element arrangement, the wedge element arrangement being connected with the chuck jaw arrangement in a manner for the transmission of rotary movement and from the outside is able to be shifted between a bottom clamping position clamping the chuck jaw arrangement inwardly against the saw blade shank and a top release position freeing the chuck jaw arrangement, in which the wedge element arrangement assumes an angular position turned in relation to the clamping position and is seated on a holding face holding the wedge element arrangement in the release position, a stationary abutment face being present, which is associated with an abutment arrangement on the saw blade shank so that, when the saw blade shank is clamped, the abutment arrangement is held by the first spring means in a downward direction against the abutment face and when the wedge element arrangement and the chuck jaw arrangement are is in the turned release position, it can be shifted past the abutment face, wherein the path of movement of the wedge element arrangement between the chucking position and the release position starting at the chucked position is composed of a longitudinal portion extending in the longitudinal direction and a rotational portion running in the peripheral direction to the holding face.

7. The saw as set forth in claim 6, wherein the chuck jaw arrangement possesses chuck jaws able to be clamped from opposite sides against the shank inserted between the chuck jaws.

8. The saw as set forth in claim 6, wherein the wedge element arrangement and the chuck jaw arrangement possess a mutually associated wedge face for the chucking force to be applied by.

9. The saw as set forth in claim 6, wherein the wedge element arrangement is formed by an inner sleeve encircling the chuck jaw arrangement.

10. The saw as set forth in claim 6, wherein the wedge element arrangement is engaged in a manner which allows the transmission of rotary movement with the chuck jaw arrangement and is able to be shifted in the longitudinal direction in relation to the chuck jaw arrangement while maintaining the rotary movement transmission engagement.

11. The saw as set forth in claim 6, wherein the wedge element arrangement is provided with at least one stationary guide track and an actuating element able to be operated from the outside so that the wedge element arrangement can be shifted along the at least one guide track out of its chucked position into the release position.

12. The saw as set forth in claim 11, wherein the at least one guide track has an L-shaped configuration.

13. The saw as set forth in claim 11, wherein the at least guide track constitutes a holding portion for the release position and the holding face is constituted by the at least one holding portion.

14. The saw as set forth in claim 11, wherein the actuating element is constituted by a rotatably arranged actuating sleeve surrounding an outer sleeve, at least one guide projection projecting outwardly in front of the outer sleeve and being engaged with a cam arranged on the actuating sleeve with the result that, on turning the actuating sleeve, its rotation is converted into a movement of the at least one guide projection along a guide track of the outer sleeve.

15. The saw as set forth in claim 14, wherein the cam is formed by a cam slot arranged inside the actuating sleeve.

16. The saw as set forth in claim 14, wherein the actuating sleeve extends essentially along the full length of the outer sleeve and is borne between radially projecting bearing projections on a housing of the chuck means.

17. The saw as set forth in claim 6, wherein the first spring means and/or the second spring means is formed by a helical spring.

18. The saw as set forth in claim 17, wherein the first spring means is movably supported in the pitman and at one end bears against the pitman and at the other end bears against a thrust member acting against the saw blade.

19. The saw as set forth in claim 17, wherein the helical spring constituting the second spring means bears at one end against a top housing of the pitman and at the other end against the wedge element arrangement.

20. The saw as set forth in claim 19, wherein the helical spring constituting the second spring means is movably supported on a spur, extending into the housing, of the pitman.

* * * * *